United States Patent [19]
Ciciora

[11] Patent Number: 5,815,297
[45] Date of Patent: Sep. 29, 1998

[54] INFRARED INTERFACE AND CONTROL APPARATUS FOR CONSUMER ELECTRONICS

[75] Inventor: Walter S. Ciciora, Southport, Conn.

[73] Assignee: General Instrument Corporation of Delaware, Chicago, Ill.

[21] Appl. No.: 547,841

[22] Filed: Oct. 25, 1995

[51] Int. Cl.⁶ .................................................. H04B 10/00
[52] U.S. Cl. ...................... 359/146; 359/147; 340/825.72
[58] Field of Search ..................... 359/142, 143, 359/146, 147, 148; 340/825.69, 825.71, 825.72

[56] References Cited

U.S. PATENT DOCUMENTS

| | | | |
|---|---|---|---|
| 4,394,691 | 7/1983 | Amano et al. | 359/148 |
| 4,718,112 | 1/1988 | Shinoda | 359/148 |
| 4,882,747 | 11/1989 | Williams | 379/102 |
| 4,885,803 | 12/1989 | Hermann et al. | 359/148 |
| 5,097,249 | 3/1992 | Yamamoto | 359/146 |
| 5,151,789 | 9/1992 | Young . | |
| 5,204,768 | 4/1993 | Tsakiris et al. | 359/148 |
| 5,255,180 | 10/1993 | Shinoda et al. | 359/148 |
| 5,418,527 | 5/1995 | Yashiro | 340/825.24 |
| 5,473,317 | 12/1995 | Inomata et al. | 359/148 |
| 5,574,965 | 11/1996 | Welmer | 455/835.2 |
| 5,606,443 | 2/1997 | Sgambati | 359/143 |

FOREIGN PATENT DOCUMENTS

| | | | |
|---|---|---|---|
| 0067397 | 4/1986 | Japan | 359/148 |
| 0220596 | 9/1989 | Japan | 359/148 |

*Primary Examiner*—Rafael Bacares
*Attorney, Agent, or Firm*—Barry R. Lipsitz; Ralph F. Hoppin

[57] ABSTRACT

A control unit provides unified control of various consumer electronic appliances such as a television, video cassette recorder, and home stereo system through remote control (e.g., infrared) signals. A receiver portion of an interface module positioned over the built-in remote control signal receiver of the appliance intercepts signals from a hand-held remote control operated by a user. The signals are routed to a control unit (such as a set-top television converter) where control logic determines a desired control action. A corresponding control action signal is routed back to a transmitter portion of the interface module and is received by the built-in remote control signal receiver of the appliance to be controlled, thereby resulting in the desired control action. The apparatus provides additional functions and increases user convenience and access to video, audio, and data signals provided via a cable television, direct satellite broadcast or similar service provider.

19 Claims, 2 Drawing Sheets

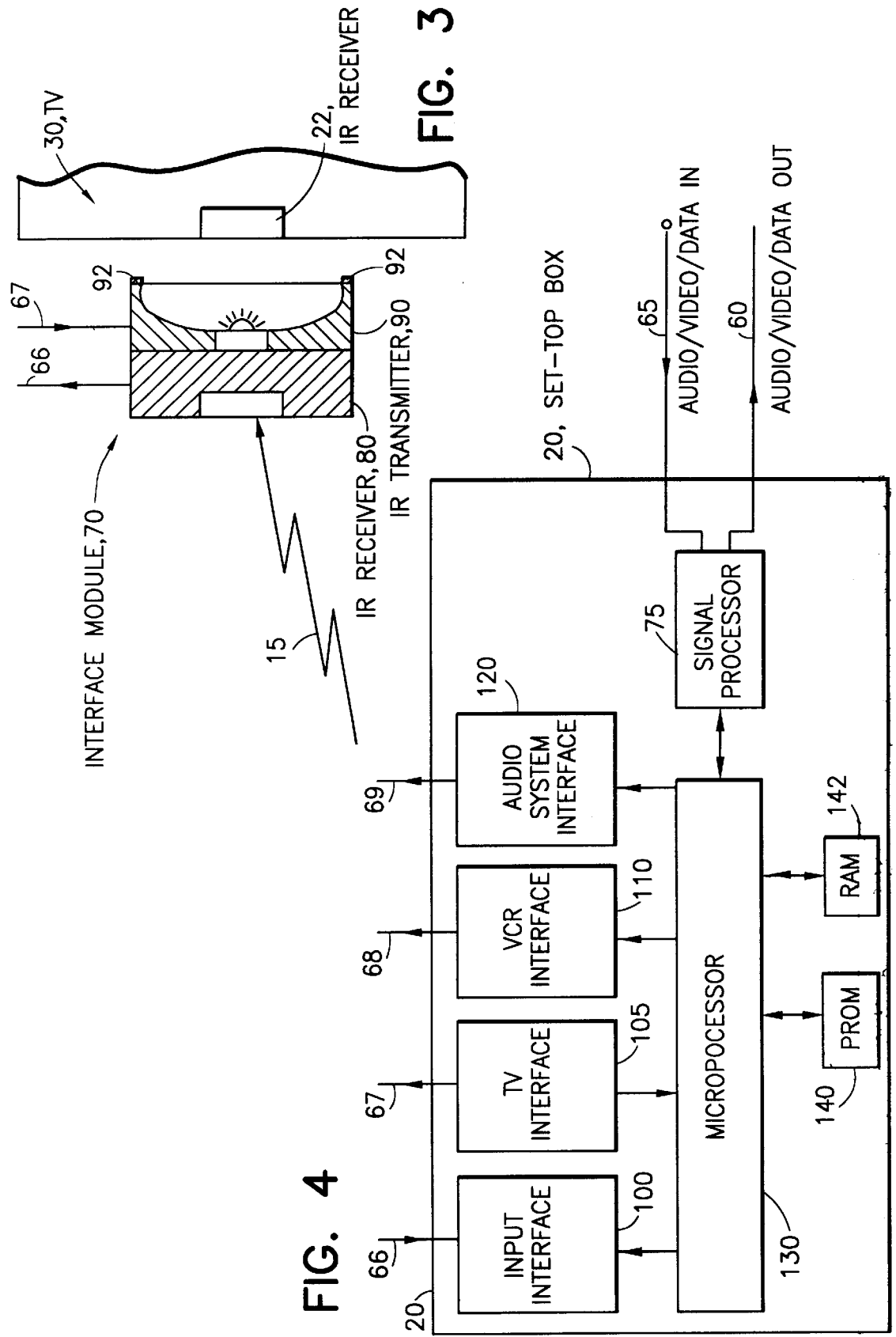

INFRARED INTERFACE AND CONTROL APPARATUS FOR CONSUMER ELECTRONICS

BACKGROUND OF THE INVENTION

The present invention relates to an electronic device for controlling a television, video cassette recorder, home stereo system or the like. In particular, the device relates to a set-top decoder box which provides unified control of the above devices through infrared signals.

Television set-top decoder boxes have become more prevalent with the increased popularity among consumers of subscription television programs. In particular, cable television (CATV) and more recently, direct broadcast satellite (DBS) programs are commonly received by individual households. Other possible transmission methods include microwave broadcast television, cellular television ("wireless cable"), and television delivered via digital telephone phone lines. See, generally, *Inside the Set-Top Box,* by Walter S. Ciciora, IEEE Spectrum, April 1995, p.70–75.

Such transmission methods allow consumers to receive a variety of entertainment and information services. For example, a consumer may receive a basic selection of programs, or special premium channel programs may be chosen for an additional charge. Information services such as stock prices, teletext for the hearing impaired and others, or weather forecasts may also be received. Digital audio is also available which provides high-fidelity music or other programming.

The first television set-top boxes added new capability to the standard television by allowing it to tune channels beyond the range of the broadcast spectrum. Cable transmissions are usually at a higher frequency range than a standard television can receive. The set-top box heterodynes or down converts the cable signal so that it may be displayed on the television. More modern "cable-ready"televisions can receive an increased range of the cable spectrum, but a set-top box is required to provide an optimum picture and to decode scrambled channels such as the premium channels. Additionally, addressable set-top boxes can be controlled by a headend controller, thereby allowing consumers to purchase pay-per-view programming.

Set-top boxes must be compatible with new digital technology such as high definition television (HDTV). The boxes will perform digital processing of compressed signals and will have interactive electronics and multimedia capabilities. Additional functions such as on-screen displays for control information, timer functions, freeze frame, and slow and fast motion are provided. Operability with other functions such as home shopping, video on demand, electronic games, educational programs, electronic publishing and other telecommunications services is also desirable.

Furthermore, as the number of channels and services available increases, there will be an increased need for electronic program guides (EPGs). EPGs will help direct the user through the myriad of different channels available through on-screen displays and a user interface such as a hand held remote controller. Information such as program listings, reviews and ratings can be provided. A viewer may receive information, for example, on the violence content of a program. Provision can be made to password protect specific programs or channels at specific times. With video-on-demand, a viewer may select a program and a start time. In this way, program delivery is customized to best serve the consumer's needs.

Moreover, the set-top box can interface with other electronic components. Primarily, of course, the set-top box interfaces with the television by receiving a transmitted signal, decoding and descrambling as required, heterodyning the signal for compatibility with the particular model of television used, tuning a selected or default channel, and performing other functions such as image enhancement. The set-top box can also interface with a video cassette recorder (VCR) to record a selected program, or with a consumer's high-fidelity home stereo system, for instance, by powering the device and choosing specific volume and tone settings. Interoperability with other recording and play devices such as video laser disks or digital audio/video tape recorders is also envisioned. The set-top box can interface further with a personal computer (PC), printer or telephone, for example, to provide facsimile (fax) machine and other capabilities. Provision can also be made for the box to interface with a "smart card" which provides authorization for specific programming Furthermore, the various functions of the set-top box can be controlled by one or more microcomputers. Software can be downloaded to a memory in the box via the received signal or via the aforementioned smart card. In this way, service providers can provide new and updated functions or fix software glitches that are subsequently discovered.

The consumer is thus faced with the problem of organizing and controlling the various capabilities provided by the television set-top decoder box. Currently, it is common for a consumer to have a home entertainment/information center that includes a set-top decoder box, a television, a VCR, and a high-fidelity audio system. Each of these electronic devices is typically controlled by a separate hand-held infrared remote controller that the consumer operates to select a desired action. For example, to view a television program, the viewer must first power the set-top box and television using their respective remote controls. Then, depending on the television model, it is necessary to tune the television to a particular channel (typically channel 3 or 4) in order to display a program from the set-top box. The set-top box is then tuned to a desired channel and the program is displayed on the television. The viewer may want to tune to a channel that provides an EPG, such as an on-screen display of currently available programming. Next, the viewer will command the television to set a desired volume level and perhaps adjust other parameters such as picture intensity, contrast, or color tone. Other parameters may be set by the viewer, such as screen display format. For example, depending on the equipment used, split-screen, picture-in-picture, zoom, aspect ratio, and display of teletext may be controlled. For instance, one may wish to combine teletext of a weather report while watching a news channel, or one may wish to combine teletext of stock market data while watching a business news channel. Likewise, one may combine teletext of sports scores while watching a sports program. Or, one may choose a combinations of settings depending upon the time of day or some other factor. The viewer may also need to address the set-top box to enter an authorization code as discussed above.

Next, the viewer may wish to control the high-fidelity audio system to receive either an audio-only channel or to receive the audio signal which accompanies a video program being viewed concurrently on the television. For example, stereo audio signals which accompany video programming are available on many broadcasts, but many televisions do not have a stereo receiver or stereo speakers built in. Thus, even with an incompatible television, the user may enjoy this feature through the use of a set-top box which routes the audio to the separate audio system. Moreover, most high-fidelity stereo systems offer far greater performance and features than any system built in to a television. Features such as "surround sound" employ multiple speakers located in a room. Additionally, special speakers, amplifiers, and audio imaging circuitry can create a home theater environment.

However, the viewer must first power the stereo system via the remote control and then set the desired volume and other parameters, such as surround sound, tone, balance, fade and so forth. Of course, many of these settings may remain the same from day to day. However, it is desirable to preselect specific settings based on the programming received. For example, while selecting one of several available audio music programs, a specific arrangement of settings may be desired. Moreover, the optimum settings may vary depending upon the type of programming selected. It is known among audiophiles, for instance, that classical music and jazz sound best at different frequency response profiles. Furthermore, one may select the full home theater effect mentioned above while viewing a movie channel in the evening, but may only desire a more modest setting while viewing the morning news. In any event, it is incumbent upon the viewer to command the system via the provided remote controller.

Finally, the viewer may wish to control a peripheral device such as a VCR or audio tape recorder. For example, it is common practice to record popular movies for redisplay at a later date when authorized by the service provider. The viewer must power the unit and select the correct commands. Moreover, the user may wish to have a computer video game displayed on the television screen. This will require the user to manually provide yet another sequence of control commands to the components involved.

With current equipment, then, the set-top box provides only a video display signal to the television after the viewer has selected the proper channel on the television and set-top box. This signal is provided via a cable which is affixed at one end to the set-top box and at the other end to a port usually located at the rear of the television. Alternately, the cable may be routed through a VCR and then to the television port. In either case, the signal provided includes only the video image which is to be displayed and an accompanying audio signal. The set-top box does not have the capability, for example, to adjust the volume of the television. Nor does the set-top box have the capability to control other peripheral components. The necessary control signals are conventionally provided by the user with one or more hand held remote controllers.

In the case of digital audio received via a set-top box, the set-top box only decodes and descrambles the signal and passes it along to the user's separate audio system for further processing (e.g., amplification and filtering) and use. In this conventional arrangement, the set-top box cannot, for example, adjust the volume or select a custom frequency response profile desired by the user.

As can be seen, the viewer is faced with the increasingly daunting task of controlling a number of sophisticated electronic devices through infrared remote controllers. Although so-called universal remote controls which consolidate the separate controls for the set-top box, television, and audio system are available, the viewer is still required to sequentially command each component to achieve the desired settings.

Moreover, the components are susceptible to receiving stray infrared signals directed toward another device. Stray signals may be picked up, for example, from a separate infrared remote controller located in an adjacent room. This is particularly a problem when components produced by the same manufacturer are used. The problem is compounded as increasing numbers of remotely-controlled devices are used in the home. Many homes have more than one remotely-controlled television or audio system and other devices, such as telephone jack or audio relay devices have also become more prevalent. Moreover, infrared signal boosters which allow one to command a device from across a large room are also increasingly popular. With a limited infrared bandwidth, these devices all pose an increasing threat of detection of stray infrared signals by the aforementioned components.

Additionally, with a conventional apparatus, the set-top box must be positioned in the line-of-sight of the infrared remote control. The box thus takes up valuable space and may be aesthetically unpleasing.

Therefore, it is desirable to have an apparatus that can provide unified control of a number of separate peripheral electronic components. The apparatus should simplify use of the components while allowing customized options to suit the needs of individual users. The apparatus is preferably operable with a single hand held infrared remote controller.

Moreover, the apparatus should eliminate the possibility of reception of stray signals. Furthermore, the apparatus should be easily installed and compatible with existing components and services along with planned future components and services. Additionally, the apparatus should be cost-effective to allow widespread use by consumers. The apparatus should also allow positioning of the set-top box in an inconspicuous place. The present invention provides such an apparatus.

SUMMARY OF THE INVENTION

In accordance with the present invention, an interface and control apparatus is provided to allow a control unit, for example, a television set-top decoder box to provide unified commands to remotely controlled peripheral components (e.g., electronic appliances such as televisions, VCRs and home audio equipment) connected thereto. The invention provides increased convenience, functionality, and simplicity for the user and eliminates the possibility of reception of stray infrared signals among the peripheral components. Moreover, the apparatus allows the control unit to be positioned inconspicuously.

The apparatus includes an interface module (e.g., infrared receiver/transmitter) that is affixed over the built-in signal receiver on a peripheral component such as a television, VCR or audio receiver. The interface module is designed and positioned such that any stray transmission, such as infrared remote control signals, cannot pass through it. In an illustrated embodiment, the interface module includes an infrared receiver on one side and an infrared transmitter on the reverse side. The infrared receiver receives command signals from a hand held infrared transmitter and provides a data output to a set-top box. The set-top box includes an input interface that receives the input command signal and provides it to a microprocessor located within the set-top box. The microprocessor communicates with a memory which includes a library of action codes. The data interface between the set-top box and the infrared receiver can comprise any known interface, such as a serial or parallel port.

Based on the input command signal received and other factors, one or more action codes is selected by the microprocessor and a corresponding output control action signal is provided to output lines (e.g., serial or parallel) via peripheral component interfaces. The control action signal is subsequently provided to one or more of the infrared transmitters at the interface modules. The module infrared transmitter transmits an infrared signal in accordance with the control action signal. The infrared transmission is received by the built-in infrared receiver located at the peripheral component to which the infrared interface module is attached, thereby producing the desired control action in the component.

The set-top box need not be located within line of sight of the user's hand held controller. The set-top box may be located, for example, behind the television or in any other convenient location near the peripheral components. The set-top box communicates with the interface modules via a thin wire that can be unobtrusively routed. In order to simplify the wiring between the devices, it is advantageous to use a serial communication interface. Moreover, since all of the interface modules receive the same infrared transmission from the hand held controller, only one of the interface devices need be equipped with an infrared receiver. Optionally, the receiver portion of the module need not be collocated with the transmitter portion of the module.

The apparatus allows a user to conveniently and simply control a number of peripheral components. Additionally, control functions are provided which are not available using the one or more conventional hand held remote controllers. Furthermore, the apparatus reduces the possibility of reception of stray signals.

BRIEF DESCRIPTION OF THE DRAWINGS

FIG. 3 is a diagrammatic view of an infrared interface module in accordance with the present invention.

FIG. 4 is a block diagram of a set-top box in accordance with the present invention.

DETAILED DESCRIPTION OF THE INVENTION

In accordance with the present invention, an infrared interface and control apparatus is provided to allow a television set-top decoder box to provide unified commands to remotely controlled peripheral components connected thereto. The invention includes an infrared interface module that is attached to one or more peripheral components that are remotely controlled by infrared signals.

Figure 1:
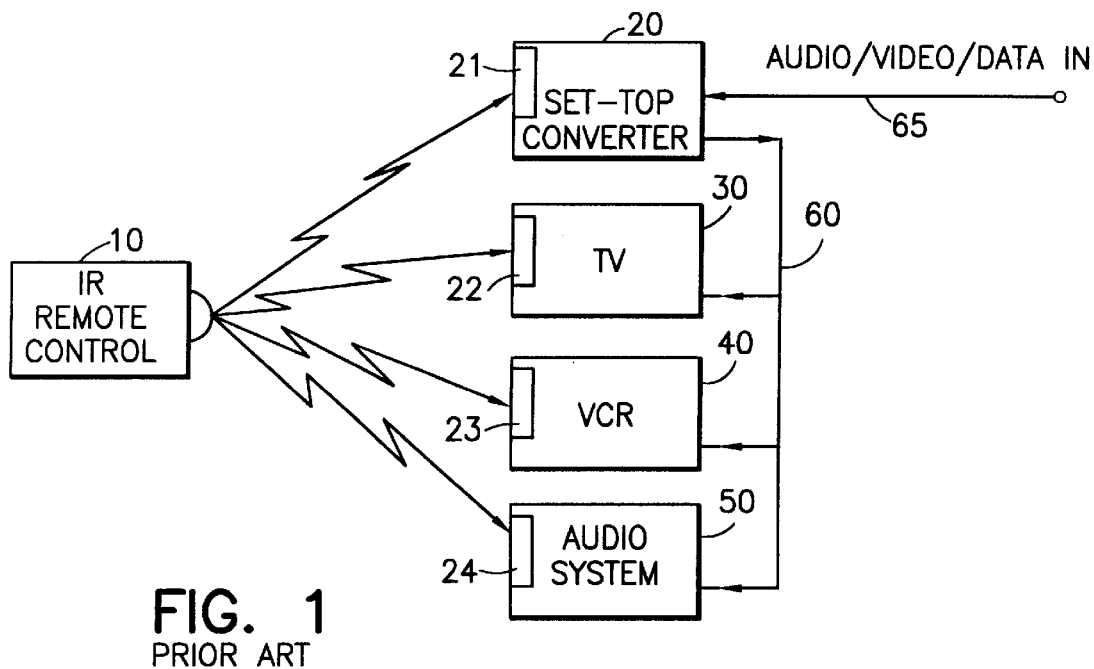
FIG. 1 is a block diagram of a conventional arrangement of a remotely controlled set-top box and peripheral components.

FIG. 1 is a block diagram of a conventional arrangement of a remotely controlled set-top box and peripheral components. A universal hand held infrared remote control 10 is used to transmit infrared signals to the set-top box 20 and peripheral components such as the television 30, VCR 40 and audio system 50 shown. As discussed, a separate remote control is often provided for the set-top box and each component, but a single universal remote control is preferably used. Universal remote controls reproduce the transmitted signals of the separate controllers, but cannot provide additional control signals beyond those originally programmed at the time of manufacture.

The set-top box and the peripheral components each include individual built-in infrared receivers 21–24 usually located at the front of the component. Each individual built-in receiver is responsive to infrared signals transmitted by the hand held controller. Control signals which are typically provided include, for example, power on, power off and volume adjustment. For the television 30, control signals can further include channel selection and other display or format adjustments, such as split-screen, picture-in-picture, zoom, aspect ratio, and display of teletext. The user may also command the television to provide an on-screen display indicating, for example, which channel is displayed or the time, date or other information.

For the VCR 40, control signals can further include commands to program the VCR to record specific channels at specific times, or, during play mode, commands include freeze frame, slow and fast motion, rewind and fast-forward. The VCR can also be commanded to provide an on-screen display on the television to facilitate user input and confirmation of commands.

For the audio system 50, control signals can further include commands to turn on different amplifiers or activate selected speakers. Additionally, special features such as surround sound or customized frequency response characteristics may be enabled depending on the user's desires. The audio signal may be received from the set-top box via connecting lines 60. The audio signal may be derived from an audio-only program such as a digital musical channel, or it may consist of the accompanying soundtrack to a video program viewed concurrently on the television. Of course, the audio system may also be operated independently of the set-top box when the audio source is, for example, a compact disc provided by the user.

Connecting lines 60 are also used to allow the set-top box to provide a video image for display on the television. The video image is also provided to the VCR for recording purposes or for rerouting to the television in some configurations. The audio portion of the signal from the set-top box is also received through connecting lines 60 by the television 30, VCR 40, and audio system 50. Typically, the video and audio portions of the signal received by the set-top box are routed on the same coaxial cables.

The set-top box 20 receives the programming signal from a cable television network, direct broadcast system or the like via line 65. As discussed previously, services can include a variety of entertainment and information services. Thus, with the conventional configuration, the user is burdened with the task of providing a sequence of control signals to the set-top box and various peripheral components in order to achieve a desired combination of audio and video programming. Moreover, the user is limited to the functions which are programmed into the respective remote controls at the time of manufacture.

Figure 2:
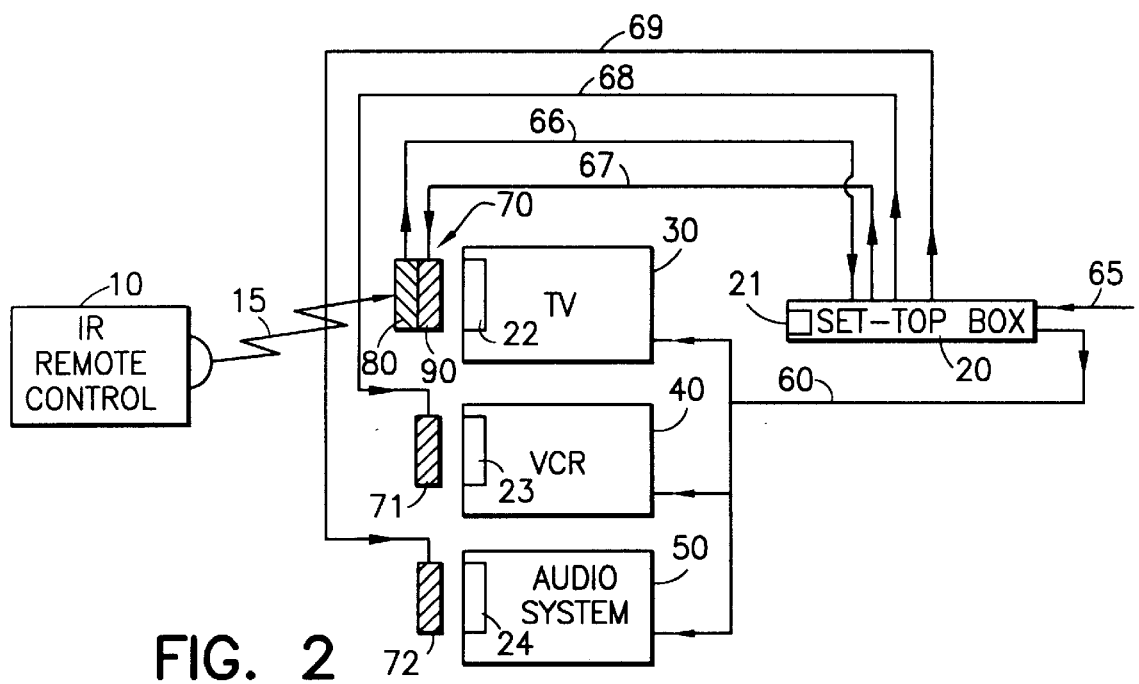
FIG. 2 is a block diagram of an infrared interface and control apparatus in accordance with the present invention.

FIG. 2 is a block diagram of one embodiment of the infrared interface and control apparatus in accordance with the present invention. Note that the set-top box 20 need not be arranged in the line of sight of the hand held infrared controller 10. This allows the user to position the set-top box 20, for example, behind the television in order to save space or for aesthetic reasons. Note also that the infrared receiver 21 in the set-top box 20 is not functional since, in the embodiment shown, no infrared signals are received there. Preferably, the infrared receiver 21 is removed, switched off, or covered to avoid possible reception of stray infrared signals.

The conventional control lines 60 remain as before, allowing the set-top box 20 to provide audio and video signals to the television 30, VCR 40, and audio system 50. Infrared interface modules 70–72 are shown positioned adjacent to the infrared receivers 22–24 which are built in to the components 30, 40 and 50, respectively. An input 66 to the set-top box 20, which is preferably a serial input, is provided from the interface module 70 for the television 30. Those skilled in the art will appreciate that other interfaces, such as a parallel interface, may also be used, although a serial interface requires fewer wires and is therefore advantageous for the present application. All infrared command signals 15 received from the hand held controller 10 are routed from the receiver portion 80 of the interface module 70 to the set-top box 20 via the input line 66.

The set-top box 20 receives the user commands via the input line 66, and as will be discussed, determines one or more control actions for one or more of the peripheral components. The control action signal is then routed to the appropriate components via output lines, which are also advantageously serial lines but may alternatively use any other type of signal communication, such as parallel lines. In the embodiment shown, the output line 67 is routed to the interface module 70 at the television 30, while the serial output line 68 is routed to the module 71 at the VCR 40, and the serial output line 69 is routed to the module 72 at the audio system 50.

FIG. 3 is a diagrammatic view of one embodiment of the infrared interface module 70 in accordance with the present invention. The interface module 70 includes a receiver portion 80 and a transmitter portion 90. The receiver portion 80 receives an infrared command signal 15 from the hand held controller 10. The module is approximately ¾ inches square and can be unobtrusively mounted over the built-in infrared receiver of the component (e.g., television 30) using, for example, two-sided adhesive tape 92, velcro, hardware fasteners, or the like. Moreover, the module is easily installed by the consumer or by the service provider's technician at the time the service is installed. The module is positioned adjacent to the component's built-in infrared receiver 22 in order to prevent the detection of unwanted stray infrared signals by the built-in receiver. At the same time, the positioning of the module allows direct and sure reception of the infrared signal generated by the transmitter portion 90 of the module.

Only one of the interface modules need include both an infrared receiver 80 and an infrared transmitter 90. The other modules include only a transmitter. For example, in the embodiment shown, the interface module 71 provided for the VCR requires only an infrared transmitter 90. The infrared transmitter 90 is designed such that infrared command signals from the hand held remote control 10 or any other stray source cannot pass through and be detected by the built-in infrared receivers 22–24 in any of the peripheral components.

The serial output 67 from the set-top box 20 communicates with a transmitter portion 90 of the interface module 70 for the television 30. Specifically, in response to control action signals received from the set-top decoder box via the output line 67, the transmitter portion 90 transmits infrared signals that are received by the television's built-in infrared receiver 22, thereby causing specific control actions in the television. Since the transmitter portion 90 is located adjacent to the built-in receiver 22, there is direct and sure communication.

Similarly, module 71 receives control action signals via output line 68, and module 72 receives control action signals via output line 69. Module 71 includes a transmitter portion which transmits infrared signals to the built-in infrared receiver 23 in the VCR 40, while module 72 includes a transmitter portion which transmits infrared signals to the built-in infrared receiver 24 in the audio system 50. The control action signals thus received by the components result in specific control actions occurring in the components.

FIG. 4 is a block diagram of one embodiment of a set-top box in accordance with the present invention. The set-top box 20 receives the audio/video/data service signal through line 65. As discussed previously, the input signal may undergo various processing functions, including filtering, heterodyning, decoding and descrambling, before it is usable to the peripheral components. In the embodiment shown, these functions are performed using a signal processor 75 which communicates with the microprocessor 130.

Moreover, the interface module and apparatus of the present invention allow the set-top box to provide additional features not available previously. The hand held controller may be provided with control buttons that are preprogrammed to perform specific functions. By pressing just one button, the user may (a) power on the set-top box and instruct the set-top controller to (b) power on the television, (c) tune the television to the channel (typically channel 2 or 3) required to receive video from the set-top box, (d) select a program for display (e.g., business news and stock data), select a screen format (e.g., display business news program with stock data on lower portion of screen and time of day and date on upper right hand portion of screen), and (e) adjust the volume of the television to a specific setting.

Alternatively, the user may press a second button which (a) powers on the set-top box and instructs the set-top controller to (b) power on the television, (c) tune the television to the channel (typically channel 3 or 4) required to receive video from the set-top box, (d) select a program for display (e.g., a movie channel), select a screen format (e.g., display movie with a 16:9 aspect ratio), (e) adjust the volume of the television to its lowest setting, (f) power on the audio system, (g) select a specific volume on the audio system, and (h) select specific speakers and frequency response profile to achieve a surround sound effect.

As another example, the user may press a third button on the hand held controller 10 which (a) powers on the set-top box and instructs the set-top controller to (b) power on the television, (c) tune the television to the channel (typically channel 2 or 3) required to receive video from the set-top box, (d) select a program for display (e.g., two different sports channels and a sports data channel that provides sports scores), select a screen format (e.g., display the sports channels in picture-in-picture format with the sports data appearing on the lower portion of the primary channel display), (e) adjust the volume of the television to its lowest setting, (f) power on the audio system, (g) select a specific volume on the audio system, and (h) select specific speakers and a frequency response profile.

As a further example, the user may press a fourth button on the hand held controller 10 which (a) powers on the set-top box and instructs the set-top controller to (b) select a digital audio channel (e.g., a jazz program), (c) power on the audio system, (d) select a specific volume on the audio system, and (e) select specific speakers and frequency response profile which best complement the musical selection.

As can been seen, the present invention allows the user to accomplish several functions which would otherwise be time consuming and complex. Additionally, the user is not limited to the functions which are programmed into the respective remote controls at the time of manufacture. Other control functions can be performed due to the capabilities of the microprocessor 130 and memory 140 of the set-top box 20.

Specifically, in the embodiment shown, a serial input signal from line 66 is received at serial input interface 100.

Interface 100 in turn communicates with microprocessor 130. The microprocessor 130 processes the serial input signal which contains commands initiated by the user via the hand held controller 10. For example, the user may press a button on the hand held controller 10 which initiates one of the aforementioned series of events wherein peripheral components are powered and other selections are made. The memory 140 (e.g., programmable read-only memory—PROM) is provided with a lookup table or library of control actions. The control action commands will be specific to the type and model of peripheral equipment used. This information can be downloaded to the memory automatically by the service provider via the received signal, can be programmed at the time of installation by a service provider's technician, or can be programmed by the user, for example, via the keypad on the remote control. In response to a single command signal initiated by the user, therefore, a sequence of control actions can be initiated which is compatible with the user's specific equipment. Random access memory (RAM) 142 is provided for use by microprocessor 130 in a conventional manner.

Control action signals are provided to the television via the television interface 105 and the serial output line 67. These control action signals can include powering on the television, tuning the television to a specific channel and adjusting the volume.

Control action signals are provided to the VCR via the VCR interface 110 and the serial output line 68. These control action signals can include powering on the VCR, commanding the VCR to display a specific on-screen menu on the television, and programming the VCR. The microprocessor can be provided with control logic in a known manner that first checks to see if the television has been powered on. If not, a control action signal can be sent to turn the television on, tune it to the required station to receive signals from the VCR, and then command the VCR as discussed.

Similarly, control action signals are provided to the audio system via the audio system interface 120 and the serial output line 69. These control action signals can include powering on the audio system and selecting a specific volume, speaker configuration, and frequency response profile.

Furthermore, the microprocessor also controls a conventional signal processor 75 for providing the necessary audio/video/data signal processing (e.g., decryption and access control) prior to outputting the signals to the peripheral components through line 60. Such processing is performed in response to the control action signals retrieved from a code library stored in memory 140. For example, in the aforementioned examples, it was seen that data such as stock prices, sports scores, weather, or other teletext data could be superimposed over a portion of a conventional video display in response to a particular command signal initiated by the user by pressing one or more buttons on the hand held infrared controller 10. A video signal containing an overlay of images is produced in the set-top box using known methods (See, e.g., commonly assigned U.S. Pat. No. 5,260,778).

An additional feature of the present invention is that software can be downloaded to the memory 140 or 142 either from the system headend through the signal input line 65 or locally through a device such as a smart card interface (not shown). In this way, service providers can provide new and updated functions or fix software glitches that are subsequently discovered.

It should now be appreciated that the present invention provides an interface module which is positioned over the built-in infrared receiver of a television, video cassette recorder, audio system or similar appliance. The module intercepts command signals from a hand-held remote control and routes the command signals to a control device such as a set-top converter, satellite, integrated receiver, descrambler, appliance control module, or the like. Control action signals are determined and routed back to a transmitter portion of the interface module where the signal is received by the built-in receiver in the appliance. In one embodiment of the present invention, a set-top converter provides unified control of a television, video cassette recorder, and home stereo system through use of the interface modules.

Although the invention has been described in connection with a specific exemplary embodiment, it should be appreciated that numerous adaptations and modifications may be made thereto, without departing from the spirit and scope of the invention as set forth in the claims.

I claim:

1. An interface module for an electronic appliance of the type that is controlled by radiated signals transmitted through free space, and which has a built-in signal detector for detecting the radiated signals, comprising:

a housing which comprises a material which substantially blocks radiated signals;

said housing being adapted to be affixed over the signal detector of the electronic appliance to prevent the signal detector from detecting stray radiated signals; and a transmitter portion carried by said housing for radiating control signals to the signal detector when the housing is affixed over said signal detector.

2. The interface module of claim 1 wherein said housing is sized according to a size of the signal detector.

3. The interface module of claim 1 wherein said transmitter portion is adapted to radiate an infrared signal to the signal detector on the electronic appliance.

4. The interface module of claim 1 wherein said transmitter portion receives a control action signal from a control unit; and the signal which is radiated from said transmitter portion to said signal detector corresponds to said control action signal.

5. A control unit for use with the interface module of claim 4, said control unit comprising:

a microprocessor;

input means operatively associated with said microprocessor for receiving command signals from a remote control; and output means for providing control action signals to said transmitter portion in response to said command signals.

6. The apparatus of claim 5, further comprising:

memory means coupled to said microprocessor for providing a lookup table of command signals received by said control unit;

said control action signals being determined by said lookup table.

7. The interface module of claim 4 wherein said control action signal is a serial signal.

8. The interface module of claim 1 wherein said housing is adapted to be affixed over the signal detector using an adhesive substance.

9. The interface module of claim 1, said housing further comprising a receiver portion for receiving radiated command signals from a remote control.

10. The interface module of claim 9, wherein said receiver portion comprises an infrared detector.

11. The interface module of claim 9 wherein:
  means are provided for coupling the command signals received by said receiver portion to a control unit; and
  said transmitter portion receives control action signals from said control unit in response to the remote control command signals received by said receiver portion.

12. The interface module of claim 1, wherein:
  said transmitter portion is disposed between said signal detector and said material which substantially blocks radiated signals when said housing is affixed over said signal detector.

13. An interface module and control apparatus for an electronic appliance of the type that is controlled by radiated signals transmitted through free space and has a built-in radiated signal detector for receiving the radiated signals, comprising:
  a housing which comprises a material which substantially blocks radiated signals;
  said housing being adapted to be affixed over the signal detector of the electronic appliance to prevent the signal detector from detecting stray radiated signals;
  said housing comprising a transmitter portion adapted to radiate control signals to the signal detector when said housing is affixed over said signal detector;
  a control unit; and
  an output line coupled from said control unit to said transmitter portion;
  wherein said transmitter portion radiates the control signals to the signal detector in accordance with control action signals which are received from said control unit via said output line for controlling the electronic appliance.

14. The interface module and control apparatus of claim 13, said housing further comprising a receiver portion for receiving radiated command signals from a remote control.

15. The interface module and control apparatus of claim 14, further comprising:
  an input line coupled from said receiver portion to said control unit;
  wherein said receiver portion passes radiated command signals received from the remote control to said control unit via said input line, said control unit being responsive to said command signals to provide said control action signals to control the electronic appliance.

16. The interface module and control apparatus of claim 15, wherein said receiver portion comprises an infrared detector.

17. The interface module and control apparatus of claim 13 wherein said control unit receives at least one of audio, video, and data signals from a service provider, said apparatus further comprising:
  means for coupling signals from said service provider to said electronic appliance.

18. An interface module for electronic appliances, comprising:
  a housing which is adapted to be attached over a signal detector on an electronic appliance;
  a transmitter portion carried by said housing for communicating with the signal detector on the electronic appliance when the housing is attached over said signal detector;
  said housing comprising a receiver portion which receives signals from a remote control; and
  means for coupling the command signals received by said receiver portion to a control unit;
  wherein said transmitter portion receives control action signals from said control unit in response to the remote control command signals received by said receiver portion.

19. An interface module and control apparatus for electronic appliances, comprising:
  a housing which is adapted to be attached over a signal detector on an electronic appliance;
  said housing comprising a transmitter portion adapted to communicate with the signal detector on the electronic appliance when said housing is attached over said signal detector;
  a control unit;
  an output line coupled from said control unit to said transmitter portion;
  wherein said transmitter portion receives control action signals from said control unit via said output line for controlling the electronic appliance;
  said housing comprising a receiver portion; and
  an input line coupled from said receiver portion to said control unit;
  wherein said receiver portion passes command signals received from a remote control to said control unit via said input line, said control unit being responsive to said command signals to provide said control action signals to control the electronic appliance.

* * * * *